United States Patent [19]

Palmaer et al.

[11] Patent Number: 5,310,045
[45] Date of Patent: * May 10, 1994

[54] SPIRAL CONVEYOR BELT WITH RIDGED DRIVE CAPSTAN

[76] Inventors: Karl V. Palmaer, 108 Winding Canyon, Folsom, Calif. 95630; Eric K. Palmaer, 11749 Melones Cir., Gold River, Calif. 95670

[*] Notice: The portion of the term of this patent subsequent to Dec. 2, 2008 has been disclaimed.

[21] Appl. No.: 985,681

[22] Filed: Dec. 2, 1992

[51] Int. Cl.⁵ ............................................. B65G 13/02
[52] U.S. Cl. ...................................... 198/778; 198/834
[58] Field of Search ................ 198/778, 831, 852, 834

[56] References Cited

U.S. PATENT DOCUMENTS

| | | |
|---|---|---|
| 4,741,430 | 5/1988 | Roinestad . |
| 4,852,720 | 8/1989 | Roinestad . |
| 4,867,301 | 9/1989 | Roinestad et al. ............... 198/778 X |
| 4,901,844 | 2/1990 | Palmaer et al. . |
| 4,941,566 | 7/1990 | Irwin . |
| 5,069,330 | 12/1991 | Palmaer et al. . |
| 5,133,449 | 7/1992 | Spangler ............................... 198/778 |
| 5,137,141 | 8/1992 | Irwin ..................................... 198/778 |
| 5,139,135 | 8/1992 | Irwin et al. ....................... 198/778 X |

*Primary Examiner*—D. Glenn Dayoan
*Attorney, Agent, or Firm*—Thomas M. Freiburger

[57] ABSTRACT

In a low tension spiral conveyor belt system, driving assistance is provided between the driving cage or capstan and a plastic conveyor belt via ridges formed generally vertically on the bars or caps on the cage bars. These ridges, preferably rounded at their exterior surfaces, interact with grooves provided in inner edge members of the belt, or with gaps between successive edge members. As the belt progresses up the spiraling incline of the system, the drive capstan ridges seat in belt grooves or gaps for a short period of time, assisting in driving engagement, then advance forward out of the groove due to the overdrive relationship of the capstan to the belt.

9 Claims, 1 Drawing Sheet

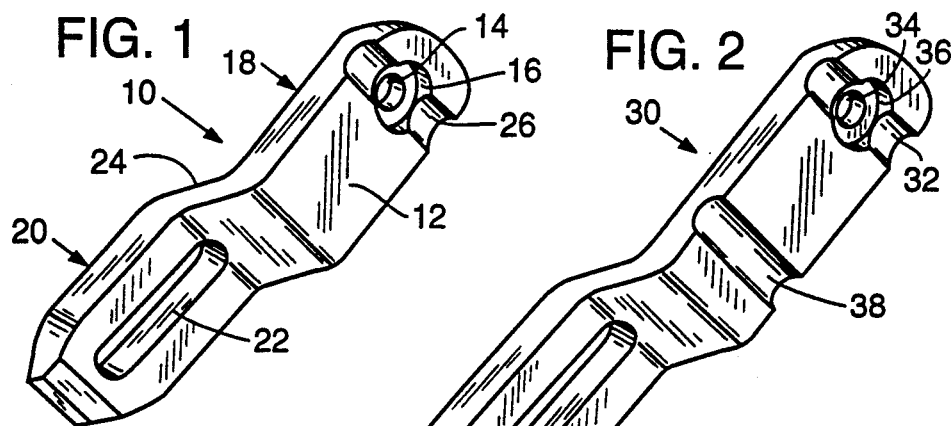
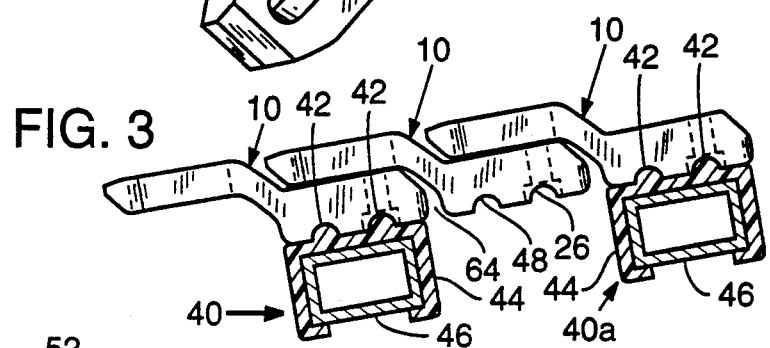
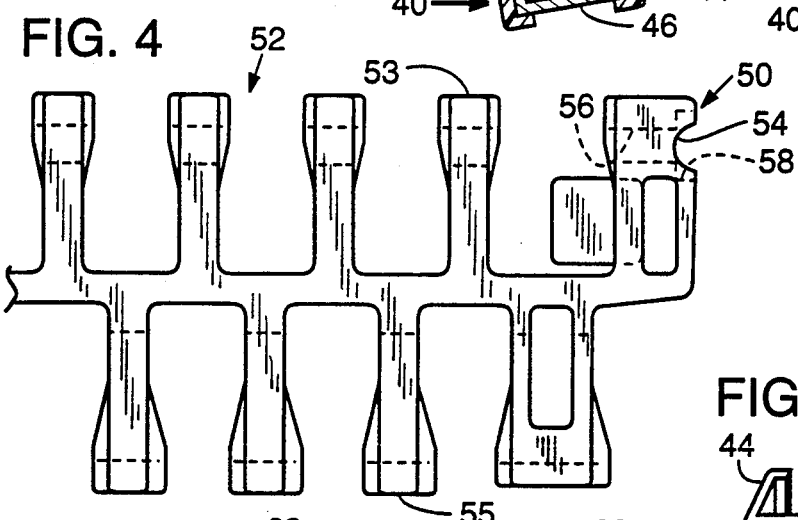
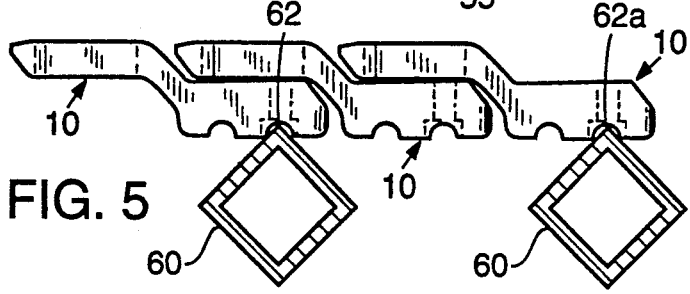
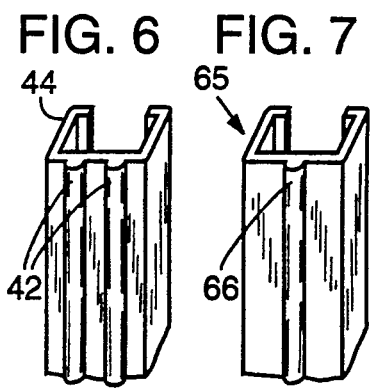

SPIRAL CONVEYOR BELT WITH RIDGED DRIVE CAPSTAN

BACKGROUND OF THE INVENTION

This invention is concerned with conveyor belts, and in particular the invention relates to a spiral conveyor belt driven in part by a driving tower or cage, and to improvement in driving engagement between the driving cage and the upwardly spiraling belt.

In a related patent, U.S. Pat. No. 5,069,330, assigned to the assignee of the present invention, a spiral conveyor belt system was disclosed wherein an edge member or side plate includes one or more generally vertical grooves formed in its outer side. These vertical grooves were positioned to engage with protruding structure of cage bars of a spiral conveyor driving cage. The modular plastic conveyor belt had recessed rod heads on the connecting rods, and at least one of the generally vertical grooves was preferably positioned coincident with the rod head recess. The driving cage was disclosed as including ridges or protrusions, preferably formed in cage bar caps assembled onto the exterior of the cage bars. At any one time, at least some of the protrusions on the cage bars are engaged in grooves of the side plates, providing assistance in the driving of the spiral conveyor belt by the driving cage.

Other approaches have been suggested for providing more positive gripping engagement or "positive drive" between a driving cage and a spiral conveyor belt, particularly for high speed spiral conveyors. See Irwin U.S. Pat. No. 4,941,566, Roinestad U.S. Pat. No. 4,741,430 and Roinestad U.S. Pat. No. 4,852,720. The Irwin patent describes jackets or caps for the cage bars of a driving cage, which are rectangular in cross section. These caps provide grooves at the outer side of each driving cage bar. The grooves cooperate with steel connecting rod heads of a metal spiral conveyor belt. Although not every rod head becomes engaged in a cage bar groove, due to phase shifting in the spacings involved, some of the rod heads do become engaged. The rod head and groove arrangement is supposed to provide some driving assistance and establish less slippage of the spiral conveyor belt against the driving cage, which moves circumferentially faster than the belt in "overdriving" relationship.

The Roinestad patents disclose another type of "positive drive" for a spiral conveyor system. In the Roinestad patents, cage bar caps include linear vertical protrusions positioned to engage against protruding rod heads in a metal spiral conveyor belt. The vertical driving protrusions of the cage bar caps are square in cross-section and are intended to grip against the protruding belt rod heads and thus drive the belt, or a portion of the belt, at the same speed as the driving tower for a certain period or arc of movement. Since a spiral conveyor belt rises as it progresses, the rod heads in the Roinestad arrangement were to ride up on the cage bar protrusions until they were released at a vertical gap or interruption in the vertical protrusion of the cage bar. This would release the rod heads and allow the rod and belt edges to spring back, then subsequently engage a second, different cage bar protrusion farther back than the first. In this way, the Roinestad "positive drive" arrangement was intended to intermittently drive groups of protruding rod heads at the same speed as the driving tower. Thus, there would be a dwell time during which rod heads would be forced to travel with the bars of the driving tower, then the differential speed would cause a snapping or jerking disengagement, which was intended to occur at the vertical gap in the cage bar protrusion.

It is a principal purpose of the present invention to provide improved driving engagement between a spiral conveyor driving cage and a plastic conveyor belt, with structure which is relatively simple and advantageous over prior apparatus aimed toward the same purpose.

SUMMARY OF THE INVENTION

In accordance with the present invention, cage bars or cage bar caps are provided having generally vertical ridges or protrusions which are configured to cooperate with the grooves of plastic conveyor belt edge members or side plates as disclosed in U.S. Pat. No. 5,069,330. These protrusions, preferably provided on cage bar caps, function in the manner disclosed in U.S. Pat. No. 5,069,330, cooperating with the belt edge grooves by seating in grooves as the overdriving capstan or drive cage advances along the belt. They are fully seated in a groove momentarily or for a short period of time before advancing out of the groove. The cage bar protrusions or ridges preferably are shaped complementarily to the grooves of the belt edge, in a rounded or partial-cylindrical shape. No gaps in these cage bar protrusions or ridges need be provided.

It is therefore among the objects of the present invention to enhance the driving relationship between a driving cage and side plates or edge members of a plastic modular conveyor belt in a spiral conveyor belt system, and to make less critical the speed relationship between an overdriven cage and a belt, this being accomplished through the provision of ridges on the driving cage and grooves at the edge of the belt. These and other objects, advantages and features of the invention will be apparent from the following description of preferred embodiments, considered along with the accompanying drawings.

DESCRIPTION OF THE DRAWINGS

FIG. 1 is a perspective view showing a side plate according to the principles of the invention, having a groove formed in an outer surface of the side plate on a common center with a rod bore.

FIG. 2 is a perspective view similar to FIG. 1 but showing a side plate for a conveyor belt of larger pitch, with the outer surface of the side plate having two grooves.

FIG. 3 is a plan view in section, showing a side plate of a conveyor belt being engaged by a cage bar, with the cage bar having a cap with groove-engaging bumps in its outer surface.

FIG. 4 is a plan view showing a modified embodiment wherein the side plate is formed integrally with a plastic module of the conveyor belt.

FIG. 5 is another view similar to FIG. 3, showing angled cage bars with edges providing protrusions, for engagement with the side plate grooves.

FIG. 6 is a perspective view showing one example of a cage bar cap which may form a part of the invention.

FIG. 7 is a view similar to FIG. 6 but showing a modified form of cage bar cap.

DESCRIPTION OF PREFERRED EMBODIMENTS

In the drawings, FIG. 1 shows a side plate 10 formed according to the principles of the present invention.

The plastic side plate 10 is adapted for inclusion as a side member in a modular plastic conveyor belt, particularly such a belt as used in a spiral conveyor belt system. The side plate 10 as conventionally used on a spiral conveyor belt system provides a surface 12 for engagement against the driving cage bars of the driving cage or driving tower. In U.S. Pat. No. 4,901,844, for example, these side plates were disclosed as having recesses or countersink bores for receiving the plastic rod heads of the modular conveyor belt, in order to prevent excessive wear on the rod heads in the spiral system.

In the present invention, as shown in FIG. 1, the rod bore 14 of the side plate 10 also has a countersink or recess 16. This is formed in the outer cage-engaging surface 12, which is on an outer leg 18 of the side plate as shown. A second leg 20 is inwardly offset and has a slot 22 which provides for expansion and collapse of the plastic conveyor belt in straight and curving paths. A central angled portion 24 of the side plate 10 connects the two offset legs 18 and 20 together.

In the side plate and system of the present invention, a groove o slot 26 is formed generally vertically in the driving engagement face 12 of the side plate, i.e. generally transverse to the length of the side plate. As indicated, the groove 26 preferably is formed on a common center with the rod bore and countersink 16. Preferably the groove is rounded as illustrated, for smooth entry and exit of a cage bar protrusion or a protrusion or ridge formed on a cage bar cap.

It should be understood that one or more additional grooves or slots 26, similar to the groove 26 shown, can be provided in the outer surface 12 of the side plate 10. Such additional groove would be spaced from and parallel to the groove 26, although not formed at the location of any bore or countersink. The groove not located at the countersink could be the sole groove.

FIG. 2 shows another side plate 30 in accordance with the principles of invention. The side plate 30, which may be of a longer length or pitch than the side plate 10 of FIG. 1, is shown with a groove or slot 32 similar to that of the side plate 10, that is, the groove 32 is formed on a common center with a rod bore 34 and countersink or recess 36. However, FIG. 2 also shows an additional groove or slot 38, similar in shape, spaced from and parallel to the groove 32. This groove 38, as mentioned above, is not formed at the location of any bore or countersink. The groove 38 could be the only groove if desired, or several grooves can be located outside the countersink.

FIG. 3 is a sectional plan view, showing a series of side plates 10 of the type shown in FIG. 2 engaged against a cage bar 40 according to the present invention. The side plates 10 are part of a modular plastic conveyor belt, the remainder of the belt not being shown in FIG. 3. The side plates 10 are at the inside of a curve of the conveyor belt, i.e. that side of the belt which engages against the driving tower or cage as the conveyor progresses in a curving and spiral path around the driving tower.

In FIG. 3 a driving cage bar is shown generally identified by the reference number 40. The cage bar 40 has one or more bumps or vertical extending protrusions or ridges 42, which may advantageously be formed in a cage bar cap 44 which is fitted over and secured to a metal cage bar 46 inside. As indicated, the protrusions 42 of the cage bars engage in the generally vertical grooves 26 of the side plates 10, which may be rounded as shown. Generally, the spacing between cage bars 40 is greater than the spacing between successive side plates 10 in the conveyor belt; thus, not every side plate 10 will be engaged by a driving cage bar at any given instant. Often even a pair of successive cage bars such as the cage bar 40 and the cage bar 40a shown in FIG. 3 will have bumps 42 that do not both engage side plate grooves simultaneously. However, a sufficient number of the bumps or ridges 42 will be engaged in side plate grooves at any given instant, that a significant driving engagement assistance results. Since the driving cage is used in an "overdrive" condition, wherein the driving cage rotates slightly faster than the movement of the spiral conveyor belt itself, the bumps 42 will engage in grooves 26 only momentarily, and will engage in different side plate grooves successively over time. This momentary engagement is different from the engagement over a prescribed dwell time as in the Roinestad patents described above, with the resulting tension forces such dwell induces in an overdriven belt.

In FIG. 3 two grooves 26 and 48 are shown in each side plate. In this case, the cage bar cap 44 can have either one or two ridges or protrusions 42. If two are included they should be at the same spacing as the grooves 26 and 48.

The cage bar caps 44 may be produced from plastic, for optimum frictional engagement with minimum wear. However, other appropriate plastics may be used if desired.

FIG. 4 shows another embodiment of the invention, wherein integral side plates 50 of conveyor belt modules 52 are used and are each provided with at least one cage bar driving engagement groove 54. The module 52 with the integral side plate 50 may be as described in copending application Ser. No. 594,623, filed Oct. 9, 1990 and commonly owned with the present invention, now U.S. Pat. No. 5,181,602. The module 52 includes oppositely extending projections 53 and 55. It should be understood that "side plate" as used herein and in the claims refers to the side plate 10 or 30, or the side plate 50.

As indicated, the generally vertical grooves 54 on the integral side plates 50 are preferably positioned across and concentrically with rod bores 56 and countersink recesses 58. The operation of the embodiment of FIG. 4 is similar to that described above. The groove 54 may be located other than over the countersink bore if desired, provided the side plate has sufficient thickness at the selected location.

FIG. 5 shows another spiral conveyor driving arrangement involving a belt with similar side plates 10 to those shown in FIG. 1, with a single groove 26 positioned concentrically with the rod bore. In this driving arrangement, the cage bars 60 of the driving cage are positioned angularly, such that a vertical edge 62 of each bar acts as a protruding ridge for engagement with the conveyor belt. The protruding edge 62 may be rounded or radiused (as shown at 62a) for engagement in the side plate grooves 26 of the conveyor, in accordance with the principle of momentary engagement and smooth entry and exit of the edges or driving protrusions in the grooves. The angling of the driving cage bars 60 eliminates the need for any cage bar capping having ridges or protrusions.

FIG. 6 shows a cage bar cap 44 in perspective, indicating that the protrusions 42 may be in the form of continuous vertical ridges, formed by extrusion of the cap 44. As noted above, these ridges have smooth, generally rounded exterior contours in the lateral direction, i.e. as viewed from above or in sectional plan view. This in combination with the generally rounded grooves in the side plates 10 or 50 assures smooth entry and exit of the ridges with the grooves, for momentary engagement, without hard snagging and with a simplicity and smoothness of operation. Even if the cage bar ridges or protrusions are used with a belt not having the illustrated grooves the rounded contour of the ridges will engage gaps between successive side plates or plastic modules (see the gap 64 in FIG. 3) with smooth, non-snagging entry and exit.

FIG. 7 shows in perspective an alternative form of cage bar cap 65, similar to the cap 44 of FIG. 6 but having a single vertical ridge or protrusion 66.

It is therefore seen that the improved cage bar and cage bar cap construction and the system of the invention, including both the side plates and the cage bar caps, significantly improve the driving engagement between a driving cage and a modular plastic spiral conveyor belt. The engagement apparatus of the invention is used in an overdriving spiral system, and it makes less critical the speed relationship between the overdriven cage and the belt. Overdrive is required, but the degree of overdrive is more flexible with the system of the invention.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a driving cage for a modular plastic conveyor belt in a spiral conveyor, the improvement comprising:
   a plurality of generally vertical cage bars positioned on the outer radius of the driving cage,
   at least some of the cage bars having means providing generally vertical protrusion on the vertical cage bar, generally rounded and smooth in the lateral direction, such that the vertical protrusions smoothly engage with and disengage from gaps in the belt's edge or vertical grooves provided in side plates of the belt, thus establishing momentary engagement of the vertical protrusions with the belt to assist in driving engagement between the driving cage and the spiral conveyor belt.

2. Apparatus according to claim 1, wherein said protrusions have a radiused outer contour.

3. Apparatus according to claim 1, wherein said means providing protrusions comprises a cage bar cap assembled onto the exterior of the vertical cage bar.

4. Apparatus according to claim 1, wherein the means providing protrusions on the cage bars comprises cage bars of generally rectangular cross section being installed angularly in the driving cage such that a protruding vertical edge of each cage bar, rounded and smooth in contour, serves as a protruding element for engagement with the conveyor belt.

5. A side plate for a modular plastic conveyor belt in a spiral conveyor, comprising,
   a molded plastic body having a pair of legs generally parallel and offset from one another, the two legs being connected by a central angled portion such that the two legs and the central angled portion define the length of the side plate,
   one of the two legs being an outer leg for positioning at an edge of a modular plastic conveyor belt and having an outer surface which is adapted for engaging cage bars of a driving cage in a spiral conveyor system, and
   formed generally vertically in the outer surface, transverse to the length of the side plate and extending through the height of the side plate,
   whereby the groove in the side plate and in similar side plates in a series of such side plates in a plastic conveyor belt may be engaged by protruding elements of a driving cage of the spiral conveyor to assist in driving engagement between the driving cage and the spiral conveyor belt.

6. A side plate according to claim 5, including a second groove formed in said outer surface, also generally vertical.

7. A side plate according to claim 5, in combination with a modular plastic conveyor belt, a series of said side plates being assembled serially along an inner edge of the conveyor belt in a spiral conveyor belt system, and including a spiral ramp and a driving cage, with the belt positioned to progress along the spiral ramp, driven by cage bars of the driving cage with the outer surfaces of the side plates exposed at the inner side of the belt in its path of spiral travel, such that the vertical grooves are exposed to the cage bars, and including means providing protrusions on the cage bars, serving as said protruding elements, and positioned and dimensioned to engage in the groove of the side plates to assist in driving the spiral conveyor belt along the driving cage in the spiral conveyor belt system.

8. The apparatus of claim 7, wherein the protrusions on the cage bars have generally rounded exterior contours in the lateral direction, to assist in smooth entry and exit with the side plate grooves, for momentary engagement of each protrusion with the belt.

9. A side plate according to claim 5, wherein the side plate comprises an integrally formed outer edge portion of a plastic conveyor belt module having a series of forward and rearwardly extending projections.

* * * * *

UNITED STATES PATENT AND TRADEMARK OFFICE
CERTIFICATE OF CORRECTION

PATENT NO. : 5,310,045

DATED : May 10, 1994

INVENTOR(S) : Karl V. Palmaer, et al

It is certified that error appears in the above-indentified patent and that said Letters Patent is hereby corrected as shown below:

Column 6, line 18, insert "a groove" before --formed--.

Column 6, line 42, correct "groove" to read --grooves--.

Signed and Sealed this

Sixth Day of December, 1994

Attest:

BRUCE LEHMAN

Attesting Officer     Commissioner of Patents and Trademarks